United States Patent
Oura et al.

(10) Patent No.: US 10,714,722 B2
(45) Date of Patent: Jul. 14, 2020

(54) COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

(71) Applicant: ZEON CORPORATION, Tokyo (JP)

(72) Inventors: Kei Oura, Tokyo (JP); Junichi Asano, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 16/307,252

(22) PCT Filed: May 10, 2017

(86) PCT No.: PCT/JP2017/017752
§ 371 (c)(1),
(2) Date: Dec. 5, 2018

(87) PCT Pub. No.: WO2017/221572
PCT Pub. Date: Dec. 28, 2017

(65) Prior Publication Data
US 2019/0221807 A1 Jul. 18, 2019

(30) Foreign Application Priority Data

Jun. 21, 2016 (JP) .................................. 2016-122952

(51) Int. Cl.
| | | |
|---|---|---|
| *H01M 2/16* | (2006.01) |
| *H01M 4/36* | (2006.01) |
| *H01M 4/62* | (2006.01) |
| *H01M 10/0525* | (2010.01) |

(52) U.S. Cl.
CPC ......... *H01M 2/166* (2013.01); *H01M 2/1653* (2013.01); *H01M 2/1686* (2013.01); *H01M 4/366* (2013.01); *H01M 4/622* (2013.01); *H01M 4/628* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 2002/0061440 A1* | 5/2002 | Suzuki .................. | H01M 4/131 429/217 |
| 2010/0003599 A1* | 1/2010 | Nonoshita ............. | H01M 4/661 429/209 |
| 2015/0333308 A1 | 11/2015 | Toyoda et al. | |
| 2016/0351873 A1* | 12/2016 | Sasaki ................. | H01M 2/1653 |
| 2017/0155107 A1* | 6/2017 | Akiike .................... | H01M 2/16 |
| 2017/0200932 A1* | 7/2017 | Sasaki ................... | H01M 2/145 |
| 2017/0275506 A1 | 9/2017 | Sasaki | |
| 2018/0351149 A1* | 12/2018 | Akiike ................. | C08F 265/08 |
| 2019/0006677 A1* | 1/2019 | Matsuo .................... | C08K 3/00 |
| 2019/0106521 A1* | 4/2019 | Takamatsu ............ | C08F 220/56 |
| 2019/0207189 A1* | 7/2019 | Arai ........................ | H01M 2/16 |
| 2019/0221807 A1* | 7/2019 | Oura ................. | H01M 10/0525 |
| 2019/0305279 A1* | 10/2019 | Takamatsu .......... | H01M 2/1653 |
| 2019/0319236 A1* | 10/2019 | Tanaka .................. | C08F 220/14 |

FOREIGN PATENT DOCUMENTS

| | | |
|---|---|---|
| JP | 2013145763 A | 7/2013 |
| WO | 2015145967 A1 | 10/2015 |
| WO | 2016051674 A1 | 4/2016 |

OTHER PUBLICATIONS

Dec. 25, 2018, International Preliminary Report on Patentability issued in the International Patent Application No. PCT/JP2017/017752.
Jun. 13, 2017, International Search Report issued in the International Patent Application No. PCT/JP2017/017752.
Sep. 30, 2019, the Extended European Search Report issued by the European Patent Office in the corresponding European Patent Application No. 17815042.1.

* cited by examiner

*Primary Examiner* — Joseph D Anthony
(74) *Attorney, Agent, or Firm* — Kenja IP Law PC

(57) ABSTRACT

A composition for a non-aqueous secondary battery functional layer contains organic particles having a specific chemical composition and properties, and a binder. The organic particles contained in the composition for a functional layer include an aromatic monovinyl monomer unit in a proportion of at least 20 mass % and not more than 70 mass % and a (meth)acrylic acid alkyl ester monomer unit in a proportion of at least 30 mass % and not more than 70 mass %. The organic particles have a degree of swelling in electrolyte solution of more than a factor of 1.0 and not more than a factor of 4.0, a volume-average particle diameter of at least 0.4 μm and not more than 1.0 μm, and a tetrahydrofuran-insoluble content of at least 20 mass % and not more than 70 mass %.

5 Claims, No Drawings

US 10,714,722 B2

COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

TECHNICAL FIELD

The present disclosure relates to a composition for a non-aqueous secondary battery functional layer, a functional layer for a non-aqueous secondary battery, and a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy density, and the ability to be repeatedly charged and discharged, and are used in a wide variety of applications. A secondary battery generally includes battery members such as a positive electrode, a negative electrode, and a separator that isolates the positive electrode and the negative electrode from one another and prevents short-circuiting between the positive and negative electrodes.

Battery members that include functional layers for providing these battery members with desired performance (for example, heat resistance and strength) are used in secondary batteries. Specifically, a separator obtained by forming a functional layer on a separator substrate or an electrode obtained by forming a functional layer on an electrode substrate including an electrode mixed material layer on a current collector may, for example, be used as a battery member. Moreover, one example of a functional layer that can improve heat resistance, strength, and so forth of a battery member is a functional layer that is composed of a porous membrane layer formed through binding of non-conductive particles by a binder (binding material). Moreover, a functional layer may, for example, be disposed between battery members in order to adhere the battery members to one another. Such a functional layer is formed by, for example, applying a composition for a functional layer that contains non-conductive particles, a binder, and a dispersion medium onto a substrate (for example, a separator substrate or an electrode substrate), and then drying the applied composition for a functional layer.

In recent years, much effort has been focused on enhancing compositions for non-aqueous secondary battery functional layers used in the formation of functional layers with the aim of further raising non-aqueous secondary battery performance (for example, refer to PTL 1).

In one specific example, PTL 1 proposes a composition for a non-aqueous secondary battery functional layer containing a particulate polymer that is a random copolymer comprising 35 mass % or more of a (meth)acrylic acid alkyl ester monomer unit and at least 30 mass % and not more than 65 mass % of an aromatic monovinyl monomer unit, and that has a degree of swelling in non-aqueous electrolyte solution of more than a factor of 1 and not more than a factor of 2. The composition for a non-aqueous secondary battery functional layer of PTL 1 can form a porous membrane having excellent durability and has excellent stability under high-shear.

CITATION LIST

Patent Literature

PTL 1: WO 2015/145967 A1

SUMMARY

Technical Problem

In a production process of a secondary battery, battery members that have not yet been immersed in electrolyte solution may be stacked, cut to the desired size as necessary, and transported as a laminate. During this cutting or transportation, shifting in position or the like of these stacked battery members may occur, leading to problems such as development of faults and reduction of productivity. Therefore, in addition to blocking resistance, battery members are required to have high adhesiveness to one another in a production process of a battery (hereinafter, also referred to as "process adhesiveness"). There has also been demand for further improvement of electrical characteristics of non-aqueous secondary batteries in recent years.

However, a functional layer formed using the composition for a non-aqueous secondary battery functional layer described in PTL 1 does not have sufficient process adhesiveness, and there is also room for improvement of electrical characteristics such as cycle characteristics and output characteristics of a non-aqueous secondary battery including such a functional layer.

Accordingly, an objective of the present disclosure is to provide a composition for a non-aqueous secondary battery functional layer that can form a functional layer having excellent process adhesiveness and can improve electrical characteristics of a non-aqueous secondary battery.

Another objective of the present disclosure is to provide a functional layer for a non-aqueous secondary battery that has excellent process adhesiveness and can improve electrical characteristics of a non-aqueous secondary battery, and a non-aqueous secondary battery that includes this functional layer for a non-aqueous secondary battery and has good electrical characteristics.

Solution to Problem

The inventors conducted diligent investigation with the aim of solving the problems set forth above. Through this investigation, the inventors discovered that by compounding organic particles having a specific chemical composition and properties with a binder in a composition for a non-aqueous secondary battery functional layer, a functional layer that has excellent process adhesiveness and can improve electrical characteristics of a non-aqueous secondary battery can be obtained. In this manner, the inventors completed the present disclosure.

Specifically, the present disclosure aims to advantageously solve the problems set forth above by disclosing a composition for a non-aqueous secondary battery functional layer comprising organic particles and a binder, wherein the organic particles include an aromatic monovinyl monomer unit in a proportion of at least 20 mass % and not more than 70 mass % and a (meth)acrylic acid alkyl ester monomer unit in a proportion of at least 30 mass % and not more than 70 mass %, the organic particles have a degree of swelling in electrolyte solution of more than a factor of 1.0 and not more than a factor of 4.0, the organic particles have a volume-average particle diameter of at least 0.4 μm and not more than 1.0 μm, and the organic particles have a tetrahydrofuran-insoluble content of at least 20 mass % and not more than 70 mass %. Through use of a composition for a functional layer containing a binder and organic particles that include an aromatic monovinyl monomer unit and a (meth)acrylic acid alkyl ester monomer unit in specific proportions and have a degree of swelling in electrolyte solution, a volume-average particle diameter, and a tetrahydrofuran-insoluble content that are each controlled to within a specific range as set forth above, it is possible to obtain a functional layer that has excellent process adhesiveness and can improve electrical characteristics of a non-aqueous secondary battery.

The phrase "including a monomer unit" as used in the present disclosure means that "a polymer obtained using that monomer includes a structural unit derived from the monomer". Moreover, "(meth)acryl" is used to indicate "acryl" and/or "methacryl" in the present disclosure.

Also, the "degree of swelling in electrolyte solution of organic particles", "volume-average particle diameter of organic particles", and "tetrahydrofuran-insoluble content of organic particles" referred to in the present disclosure can be determined by methods described in the EXAMPLES section of the present specification.

In the presently disclosed composition for a non-aqueous secondary battery functional layer, the organic particles preferably further include a crosslinkable monomer unit in a proportion of at least 0.2 mass % and not more than 0.8 mass %. When the organic particles contained in the composition for a functional layer include a crosslinkable monomer unit within the range set forth above, process adhesiveness of a functional layer formed using the composition for a functional layer can be further improved, and electrical characteristics of a non-aqueous secondary battery including the formed functional layer can be further improved.

In the presently disclosed composition for a non-aqueous secondary battery functional layer, the organic particles are preferably a random copolymer. When the organic particles are a random copolymer, the organic particles can be homogenized, process adhesiveness of a functional layer formed using the composition for a functional layer containing these organic particles can be further improved, and electrical characteristics of a non-aqueous secondary battery including the formed functional layer can be further improved.

The presently disclosed composition for a non-aqueous secondary battery functional layer preferably further comprises inorganic particles. This is because electrical characteristics of a non-aqueous secondary battery can be further improved when the composition for a functional layer further contains inorganic particles.

Moreover, a presently disclosed functional layer for a non-aqueous secondary battery that can advantageously solve the problems set forth above is formed using any one of the compositions for a non-aqueous secondary battery functional layer set forth above. The functional layer for a non-aqueous secondary battery has excellent process adhesiveness and can improve electrical characteristics of a non-aqueous secondary battery including the functional layer.

Furthermore, a presently disclosed non-aqueous secondary battery that can advantageously solve the problems set forth above comprises the presently disclosed functional layer for a non-aqueous secondary battery. The non-aqueous secondary battery has good electrical characteristics.

Advantageous Effect

According to the present disclosure, it is possible to provide a composition for a non-aqueous secondary battery functional layer that can form a functional layer having excellent process adhesiveness and can improve electrical characteristics of a non-aqueous secondary battery.

Moreover, according to the present disclosure, it is possible to provide a functional layer for a non-aqueous secondary battery that has excellent process adhesiveness and can improve electrical characteristics of a non-aqueous secondary battery, and a non-aqueous secondary battery that includes this functional layer for a non-aqueous secondary battery and has good electrical characteristics.

DETAILED DESCRIPTION

The following provides a detailed description of embodiments of the present disclosure.

The presently disclosed composition for a non-aqueous secondary battery functional layer is used as a material in production of a functional layer for a non-aqueous secondary battery. Moreover, the presently disclosed functional layer for a non-aqueous secondary battery is formed using the presently disclosed composition for a non-aqueous secondary battery functional layer. Furthermore, the presently disclosed non-aqueous secondary battery includes at least the presently disclosed functional layer for a non-aqueous secondary battery.

(Composition for Non-Aqueous Secondary Battery Functional Layer)

The presently disclosed composition for a non-aqueous secondary battery functional layer is a slurry composition that has water or the like as a dispersion medium and that contains organic particles and a binder, and may optionally further contain inorganic particles and other components. One feature of the presently disclosed composition for a non-aqueous secondary battery functional layer is that the organic particles include an aromatic monovinyl monomer unit in a proportion of at least 20 mass % and not more than 70 mass % and a (meth)acrylic acid alkyl ester monomer unit in a proportion of at least 30 mass % and not more than 70 mass %. Another feature is that the organic particles have a degree of swelling in electrolyte solution of more than a factor of 1.0 and not more than a factor of 4.0, a volume-average particle diameter of at least 0.4 μm and not more than 1.0 μm, and a tetrahydrofuran-insoluble content (hereinafter, also referred to as "THF-insoluble content") of at least 20 mass % and not more than 70 mass %. The presently disclosed composition for a non-aqueous secondary battery functional layer can form a functional layer having excellent process adhesiveness as a result of including the organic particles having a specific chemical composition and properties and the binder in combination.

<Organic Particles>

The organic particles contained in the composition for a non-aqueous secondary battery functional layer are particles that are non-conductive and that, in a functional layer, contribute to improving adhesiveness of the functional layer prior to immersion in electrolyte solution (i.e., process adhesiveness).

[Chemical Composition of Organic Particles]

The organic particles include an aromatic monovinyl monomer unit in a proportion of at least 20 mass % and not more than 70 mass % and a (meth)acrylic acid alkyl ester monomer unit in a proportion of at least 30 mass % and not more than 70 mass %, and may optionally further include a crosslinkable monomer unit and other monomer units.

—(Meth)Acrylic Acid Alkyl Ester Monomer Unit—

Examples of (meth)acrylic acid alkyl ester monomers that may be used to form the (meth)acrylic acid alkyl ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, stearyl acrylate, and cyclohexyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, glycidyl methacrylate, and cyclohexyl methacrylate. One of these (meth)acrylic acid alkyl ester monomers may be used individually, or two or more of these (meth)acrylic acid alkyl ester monomers may be used in combination. In the present disclosure, "(meth)acryl" is used to indicate "acryl" and/or "methacryl".

The carbon number of an alkyl group bonded to a non-carbonyl oxygen atom in the (meth)acrylic acid alkyl ester monomer is preferably 3 or more, and more preferably 4 or more, and is preferably 18 or less, and more preferably 12 or less. Since a (meth)acrylic acid alkyl ester monomer in which the carbon number of the alkyl group bonded to the non-carbonyl oxygen atom is within any of the ranges set forth above has appropriate hydrophobicity, the amount of water that is imported into a secondary battery due to the organic particles can be reduced, electrolyte decomposition can be inhibited, and secondary battery electrical characteristics can be improved. Suitable examples of acrylic acid alkyl ester monomers in which the carbon number of the alkyl group bonded to the non-carbonyl oxygen atom is 4 or more include n-butyl acrylate, 2-ethylhexyl acrylate, and cyclohexyl acrylate. Of these acrylic acid alkyl ester monomers, n-butyl acrylate is preferable from a viewpoint of process adhesiveness and improving electrical characteristics of an obtained secondary battery.

The percentage content of the (meth)acrylic acid alkyl ester monomer unit in the organic particles when all monomer units included in the organic particles are taken to be 100 mass % is required to be at least 30 mass % and not more than 70 mass %, and is preferably at least 35 mass % and not more than 65 mass %. When the percentage content of the (meth)acrylic acid alkyl ester monomer unit is at least any of the lower limits set forth above, wettability of a functional layer with respect to electrolyte solution is improved, and electrical characteristics (particularly low-temperature output characteristics) of a secondary battery including the functional layer can be improved. Moreover, when the percentage content of the (meth)acrylic acid alkyl ester monomer unit is not more than any of the upper limits set forth above, close adhesion strength of battery members through a functional layer can be improved.

—Aromatic Monovinyl Monomer Unit—

Examples of aromatic monovinyl monomers that may be used to form the aromatic monovinyl monomer unit include styrene, styrenesulfonic acid and salts thereof (for example, sodium styrenesulfonate), α-methylstyrene, vinyltoluene, and 4-(tert-butoxy)styrene. Of these aromatic monovinyl monomers, styrene and sodium styrenesulfonate are preferable, and styrene is more preferable. Styrene is particularly preferable as an aromatic monovinyl monomer from a viewpoint of improving secondary battery electrical characteristics. One of these aromatic monovinyl monomers may be used individually, or two or more of these aromatic monovinyl monomers may be used in combination.

The percentage content of the aromatic monovinyl monomer unit in the organic particles when all monomer units included in the organic particles are taken to be 100 mass % is required to be at least 20 mass % and not more than 70 mass %, is preferably 30 mass % or more, and more preferably 35 mass % or more, and is preferably 65 mass % or less, and more preferably 60 mass % or less. When the percentage content of the aromatic monovinyl monomer unit is at least any of the lower limits set forth above, the degree of swelling in electrolyte solution of the organic particles can be inhibited from becoming excessively large, reduction of ion permeability of a functional layer can be inhibited, and low-temperature output characteristics of a secondary battery including the functional layer can be improved. Moreover, when the percentage content of the aromatic monovinyl monomer unit is not more than any of the upper limits set forth above, secondary battery high-temperature cycle characteristics can be improved.

—Crosslinkable Monomer Unit—

The crosslinkable monomer unit is a monomer unit other than the (meth)acrylic acid alkyl ester monomer unit and the aromatic monovinyl monomer unit set forth above. Accordingly, the (meth)acrylic acid alkyl ester monomers and aromatic monovinyl monomers listed above are not included among crosslinkable monomers that may be used to form the crosslinkable monomer unit.

A monomer that can form a crosslinked structure in polymerization may be used as a crosslinkable monomer that can form the crosslinkable monomer unit. Specific examples include a monofunctional monomer having a thermally crosslinkable group and one ethylenic double bond per molecule, and a multifunctional monomer having two or more ethylenic double bonds per molecule. Examples of the thermally crosslinkable group included in the monofunctional monomer include an epoxy group, an N-methylol amide group, an oxetanyl group, an oxazoline group, and combinations thereof. The degree of swelling in electrolyte solution of the organic particles can be adjusted to an appropriate level through inclusion of the crosslinkable monomer unit.

The crosslinkable monomer may be hydrophobic or hydrophilic.

Note that when a crosslinkable monomer is referred to as "hydrophobic" in the present disclosure, this means that the crosslinkable monomer does not include a hydrophilic group, whereas when a crosslinkable monomer is referred to as "hydrophilic" in the present disclosure, this means that the crosslinkable monomer includes a hydrophilic group. Herein, the term "hydrophilic group" used with respect to the crosslinkable monomer refers to a carboxy group, a hydroxy group, a sulfo group, a phosphate group, an epoxy group, a thiol group, an aldehyde group, an amide group, an oxetanyl group, or an oxazoline group.

Examples of hydrophobic crosslinkable monomers (hydrophobic crosslinking agents) include multifunctional (meth)acrylates such as allyl (meth)acrylate, ethylene di(meth)acrylate, diethylene glycol di(meth)acrylate, triethylene glycol di(meth)acrylate, tetraethylene glycol di(meth)acrylate, and trimethylolpropane tri(meth)acrylate; multifunctional allyl/vinyl ethers such as dipropylene glycol diallyl ether, polyglycol diallyl ether, triethylene glycol divinyl ether, hydroquinone diallyl ether, and tetraallyloxyethane; and divinylbenzene.

Examples of hydrophilic crosslinkable monomers (hydrophilic crosslinking agents) include vinyl glycidyl ether, allyl glycidyl ether, methylolacrylamide, and acrylamide.

One of these crosslinkable monomers may be used individually, or two or more of these crosslinkable monomers may be used in combination.

Of these crosslinkable monomers, hydrophobic crosslinkable monomers are preferable, and ethylene dimethacrylate and allyl methacrylate are more preferable from a viewpoint of improving secondary battery electrical characteristics (particularly cycle characteristics).

The percentage content of the crosslinkable monomer unit in the organic particles when all monomer units included in the organic particles are taken to be 100 mass % is preferably 0.20 mass % or more, more preferably 0.25 mass % or more, and particularly preferably 0.30 mass % or more, and is preferably 0.80 mass % or less, more preferably 0.75 mass % or less, and particularly preferably 0.70 mass % or less. When the percentage content of the crosslinkable monomer unit is at least any of the lower limits set forth above, non-aqueous secondary battery electrical characteristics (particularly cycle characteristics) can be improved because elution of the organic particles into a non-aqueous electrolyte solution can be inhibited. On the other hand, when the percentage content of the crosslinkable monomer unit is not more than any of the upper limits set forth above, a certain degree of mobility of the organic particles in a functional layer can be ensured when the functional layer is heated, and process adhesiveness can be improved.

—Other Monomer Units—

No specific limitations are placed on other monomer units that may optionally be included in the organic particles and examples thereof include an acidic group-containing monomer unit.

The acidic group-containing monomer unit is a monomer unit other than the (meth)acrylic acid alkyl ester monomer unit, the aromatic monovinyl monomer unit, and the crosslinkable monomer unit that can be formed by the various monomers described above.

Examples of acidic group-containing monomers that may be used to form the acidic group-containing monomer unit include carboxy group-containing monomers, sulfo group-containing monomers, and phosphate group-containing monomers.

Examples of carboxy group-containing monomers that may be used include ethylenically unsaturated monocarboxylic acids, derivatives of ethylenically unsaturated monocarboxylic acids, ethylenically unsaturated dicarboxylic acids, acid anhydrides of ethylenically unsaturated dicarboxylic acids, and derivatives of ethylenically unsaturated dicarboxylic acids and acid anhydrides thereof.

Examples of ethylenically unsaturated monocarboxylic acids include acrylic acid, methacrylic acid, and crotonic acid. Examples of derivatives of ethylenically unsaturated monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of ethylenically unsaturated dicarboxylic acids include maleic acid, fumaric acid, and itaconic acid. Examples of acid anhydrides of ethylenically unsaturated dicarboxylic acids include maleic anhydride, acrylic anhydride, methylmaleic anhydride, and dimethylmaleic anhydride. Examples of derivatives of ethylenically unsaturated dicarboxylic acids include methylmaleic acid, dimethylmaleic acid, phenylmaleic acid, chloromaleic acid, dichloromaleic acid, fluoromalic acid, diphenyl maleate, nonyl maleate, decyl maleate, dodecyl maleate, octadecyl maleate, and fluoroalkyl maleate.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

In the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Of these examples, ethylenically unsaturated monocarboxylic acids and ethylenically unsaturated dicarboxylic acids are preferable as acidic group-containing monomers. Note that among ethylenically unsaturated monocarboxylic acids, acrylic acid and methacrylic acid are preferable, and among ethylenically unsaturated dicarboxylic acids, itaconic acid is preferable.

The percentage content of the acidic group-containing monomer unit in the organic particles when all monomer units included in the organic particles are taken to be 100 mass % is preferably at least 0.1 mass % and not more than 8.0 mass %. When the percentage content of the acidic group-containing monomer unit is within the range set forth above, electrical characteristics (particularly low-temperature output characteristics) of a secondary battery including a functional layer that is formed using the composition for a functional layer can be improved.

[Production of Organic Particles]

The organic particles are produced through polymerization of a monomer composition containing the monomers set forth above. Polymerization is preferably initiated with the monomers in the monomer composition in a monomeric state rather than in an oligomeric state having undergone a certain degree of polymerization. This inhibits production of block copolymer and graft copolymer such as to enable production of the organic particles as a random copolymer. When the organic particles are a random copolymer, the organic particles can be homogenized, process adhesiveness of a functional layer formed using the composition for a functional layer containing the organic particles can be further improved, and electrical characteristics of a non-aqueous secondary battery including the formed functional layer can be further improved. Moreover, when the organic particles are a random copolymer, water can be more easily removed from a functional layer during drying because viscosity of the composition for a functional layer can be suppressed.

The percentage content of each monomer in the monomer composition is usually the same as the percentage content of the corresponding monomer unit in the desired organic particles.

No specific limitations are placed on the mode of polymerization of the organic particles. For example, any method among solution polymerization, suspension polymerization, bulk polymerization, and emulsion polymerization may be used. The polymerization reaction may be, for example, addition polymerization such as ionic polymerization, radical polymerization, or living radical polymerization. The polymerization may be carried out with a commonly used emulsifier, dispersant, polymerization initiator, polymerization aid, chain transfer agent, or the like, and the amount thereof may also be the same as commonly used.

[Properties of Organic Particles]

The organic particles contained in the presently disclosed composition for a functional layer are required to have a degree of swelling in electrolyte solution of more than a factor of 1.0 and not more than a factor of 4.0, and a volume-average particle diameter of at least 0.4 μm and not more than 1.0 μm. Note that in the case of organic particles having a core structure and a shell structure, so long as the shell structure meets the same chemical composition and property requirements as the organic particles according to the present disclosure, these organic particles are considered to be included among the organic particles according to the present disclosure. The following provides a detailed description of properties of the organic particles, inclusive of the properties mentioned above.

—Degree of Swelling in Electrolyte Solution—

The "degree of swelling in electrolyte solution" of organic particles referred to in the present disclosure can be determined as a value (factor) obtained by dividing the weight of a film prepared through shaping of the organic particles after the film has been immersed in a specific non-aqueous electrolyte solution under specific conditions by the weight of the film prior to this immersion. Specifically, a film can be shaped by a method described in the EXAMPLES section of the present specification and then measurement can be carried out by a measurement method described in the same EXAMPLES section.

The degree of swelling in non-aqueous electrolyte solution of the organic particles is required to be more than a factor of 1.0 and not more than a factor of 4.0, is preferably more than a factor of 1.5, and is preferably a factor of 3.5 or less, and more preferably a factor of 3.0 or less. A degree of swelling of the organic particles in electrolyte solution that is more than any of the lower limits set forth above can improve wettability of a functional layer with respect to a non-aqueous electrolyte solution and can improve secondary battery electrical characteristics (particularly low-temperature output characteristics). A degree of swelling of the organic particles in electrolyte solution that is not more than any of the upper limits set forth above can inhibit narrowing of pores within a functional layer by swollen organic particles in a state in which the functional layer is immersed in a non-aqueous electrolyte solution and can improve non-aqueous secondary battery electrical characteristics (particularly cycle characteristics). Moreover, a degree of swelling of the organic particles in electrolyte solution that is within any of the ranges set forth above can inhibit deposition of lithium dendrites and the like in the case of a non-aqueous secondary battery that is a lithium ion secondary battery.

The degree of swelling in electrolyte solution of the organic particles can be adjusted by altering the types and amounts of used monomers. For example, the degree of swelling in electrolyte solution can be reduced by altering the type of aromatic monovinyl monomer or crosslinkable monomer, or by increasing the amount thereof, raising the polymerization temperature, or increasing the polymerization reaction time so as to increase the polymerized molecular weight.

—Random Copolymer Structure—

As previously explained, the organic particles are preferably a random copolymer. It can be determined whether or not organic particles have a random copolymer structure through glass-transition temperature measurement of the organic particles.

Specifically, when organic particles that are a copolymer have one glass-transition temperature, this indicates that the organic particles are a random copolymer. Conversely, when organic particles have two or more glass-transition temperatures, this indicates that the organic particles do not have a random copolymer structure and are a block copolymer or a graft copolymer, or have a core-shell structure or the like.

The "glass-transition temperature" of organic particles referred to in the present disclosure can be measured by a measurement method described in the EXAMPLES section of the present specification.

The glass-transition temperature of the organic particles is preferably 100° C. or lower, more preferably 50° C. or lower, and particularly preferably 30° C. or lower. Moreover, although no specific limitations are placed on the lower limit for the glass-transition temperature of the organic particles, the glass-transition temperature of the organic particles is normally −100° C. or higher, and preferably −30° C. or higher.

—Volume-Average Particle Diameter of Organic Particles—

The volume-average particle diameter of the organic particles is preferably 0.40 μm or more, more preferably 0.50 μm or more, and even more preferably 0.55 μm or more, and is preferably 1.00 μm or less, more preferably 0.90 μm or less, and even more preferably 0.80 μm or less. When the volume-average particle diameter of the organic particles is at least any of the lower limits set forth above, excessive densification of a functional layer leading to concentration of lithium deposition at a specific location at the surface of a negative electrode in a case in which the functional layer is used to form a lithium ion secondary battery can be inhibited, and deposition of lithium dendrites can be inhibited. Moreover, when the volume-average particle diameter of the organic particles is at least any of the lower limits set forth above, in a case in which the organic particles are compounded in an amount that does not cause excessive densification of a functional layer, it is possible to avoid a situation in which process adhesiveness is not readily displayed due, in particular, to the organic particles only occupying a small surface area at the surface of the functional layer. Furthermore, when the volume-average particle diameter of the organic particles is not more than any of the upper limits set forth above, a thinner functional layer can be formed, and non-aqueous secondary battery electrical characteristics (particularly low-temperature output characteristics) can be improved. Also, when the volume-average particle diameter of the organic particles is not more than any of the upper limits set forth above, a decrease in contact points between the organic particles and an adherend substance or an increase in functional layer thickness caused by increased organic particle diameter, leading to process adhesiveness not being readily displayed, can be inhibited.

The volume-average particle diameter of the organic particles is preferably at least as large as the volume-average particle diameter of the subsequently described binder. This is because excessive densification of a functional layer can be further inhibited when the volume-average particle diameter of the organic particles is at least as large as the volume-average particle diameter of the binder.

The volume-average particle diameter of the organic particles can, for example, be reduced by increasing the amount of emulsifier that is added in production of the organic particles and, conversely, can be increased by reducing the amount of emulsifier that is added in production of the organic particles, but is not specifically limited to being adjusted in this manner.

The "volume-average particle diameter" of the organic particles represents the particle diameter at which, in a particle size distribution (volume basis) measured by laser diffraction, the cumulative volume calculated from the small diameter end of the distribution reaches 50%.

[Tetrahydrofuran-Insoluble Content]

The tetrahydrofuran-insoluble content of the organic particles is required to be at least 20 mass % and not more than 70 mass %. Moreover, the THF-insoluble content of the organic particles is preferably 25 mass % or more, and more preferably 30 mass % or more, and is preferably 65 mass % or less, more preferably 60 mass % or less, and even more preferably 57 mass % or less. When the THF-insoluble content of the organic particles is at least any of the lower limits set forth above, non-aqueous secondary battery electrical characteristics (particularly cycle characteristics) can be improved because elution of the organic particles into a non-aqueous electrolyte solution can be inhibited. On the other hand, when the THF-insoluble content of the organic particles is not more than any of the upper limits set forth above, mobility of the organic particles in a functional layer when the functional layer is heated can be improved, and process adhesiveness can be improved.

The THF-insoluble content of the organic particles can be adjusted by, for example, altering the polymerization temperature in polymerization of the organic particles, the amount of chain transfer agent added in polymerization, or the amount of emulsifier added in polymerization.

[Content Ratio of Organic Particles]

Although no specific limitations are placed on the content ratio of the organic particles in the composition for a functional layer, the content ratio relative to 100 parts by mass of inorganic particles is preferably 50 parts by mass or more, and more preferably 60 parts by mass or more, and is preferably 100 parts by mass or less, and more preferably 98 parts by mass or less. When the content ratio of the organic particles is within any of the ranges set forth above, adhesiveness of a functional layer can be sufficiently increased, and electrical characteristics of a secondary battery including the functional layer can be improved.

<Binder>

The binder contained in the composition for a non-aqueous secondary battery functional layer is a component that ensures strength of an obtained functional layer and holds various components contained in the functional layer so that these components do not become detached from the functional layer. The binder is normally a polymer that is not water-soluble and is present in an aqueous medium in the form of particles. In other words, the binder is normally a water-insoluble polymer. When a polymer is referred to as "water-insoluble" in the present disclosure, this means that when 0.5 g of the polymer is dissolved in 100 g of water at 25° C., insoluble content is 90 mass % or more.

The binder may be a thermoplastic elastomer, but is not specifically limited thereto. Conjugated diene polymers and acrylic polymers are preferable, and acrylic polymers are more preferable as the thermoplastic elastomer from a viewpoint of binding capacity.

The term "conjugated diene polymer" is used to refer to a polymer comprising more than 50 mass % of a conjugated diene monomer unit when all monomer units included in the polymer are taken to be 100 mass %. Specific examples of conjugated diene polymers that may be used include, but are not specifically limited to, copolymers that include an aromatic vinyl monomer unit and an aliphatic conjugated diene monomer unit, such as styrene-butadiene copolymer, butadiene rubbers, acrylic rubbers (copolymers including an acrylonitrile unit and a butadiene unit), and hydrogenated products thereof.

The term "acrylic polymer" is used to refer to a polymer comprising more than 70 mass % of a (meth)acrylic acid ester monomer unit or a (meth)acrylic acid alkyl ester monomer unit when all monomer units included in the polymer are taken to be 100 mass %. The acrylic polymer is preferably a polymer comprising more than 70 mass % of (meth)acrylic acid alkyl ester monomer units formed using one (meth)acrylic acid ester monomer used individually or two or more (meth)acrylic acid ester monomers used in combination, such as any of those listed above in the "Chemical composition of organic particles" section.

An acrylic polymer that can be preferably used as the binder more preferably includes a (meth)acrylonitrile monomer unit. This can increase functional layer strength. In the present disclosure, "(meth)acrylonitrile" is used to indicate "acrylonitrile" and/or "methacrylonitrile".

[Volume-Average Particle Diameter of Binder]

The volume-average particle diameter of the binder is preferably not larger than the volume-average particle diameter of the organic particles as previously explained, and is more preferably at least 0.1 µm and not more than 0.35 µm. When the volume-average particle diameter of the binder is within the range set forth above, non-aqueous secondary battery electrical characteristics can be further improved. The volume-average particle diameter of the binder can be altered without any specific limitations by, for example, adjusting the amount of emulsifier that is added, the polymerization time, and so forth in a subsequently described production method of a polymer that can be used as the binder.

The "volume-average particle diameter of the binder" referred to in the present disclosure can be measured in the same way as the volume-average particle diameter of the organic particles.

Examples of methods for producing the polymers set forth above that can be used as the binder include solution polymerization, suspension polymerization, and emulsion polymerization. Of these methods, emulsion polymerization and suspension polymerization are preferable in terms that polymerization can be carried out in water and a resultant water dispersion containing the binder can suitably be used, as produced, as a material in the composition for a functional layer.

[Tetrahydrofuran-Insoluble Content]

The tetrahydrofuran-insoluble content of the binder is preferably 75 mass % or more, and more preferably 80 mass % or more, and is preferably 100 mass % or less, and more preferably 95 mass % or less.

The THF-insoluble content of the binder can be adjusted by, for example, altering the polymerization temperature in polymerization of the binder, the amount of chain transfer agent added in polymerization, or the amount of emulsifier added in polymerization.

[Content Ratio of Organic Particles and Binder]

Although no specific limitations are placed on the content ratio of the organic particles and the binder in the composition for a functional layer, the content of the organic particles when the total content of the organic particles and the binder is taken to be 100 mass % is preferably 1 mass % or more, and more preferably 80 mass % or more, and is preferably 99 mass % or less, and more preferably 95 mass % or less. When the proportion constituted by the organic particles among the total content of the organic particles and the binder is within any of the ranges set forth above, adhesiveness of a functional layer can be sufficiently increased, and electrical characteristics of a secondary battery including the functional layer can be improved.

<Inorganic Particles>

The inorganic particles that may optionally be contained in the composition for a non-aqueous secondary battery functional layer are non-conductive particles that maintain their shape without dissolving in water used as the dispersion medium in the composition for a functional layer or in a non-aqueous electrolyte solution of a secondary battery. The inorganic particles can further improve secondary battery electrical characteristics due to their electrochemical stability. Moreover, through inclusion of the inorganic particles in the composition for a functional layer, a reticulated structure of an obtained functional layer can be blocked to an appropriate degree such that lithium dendrites and the like are prevented from passing through the functional layer, and electrode short-circuiting can be more reliably prevented.

Examples of inorganic particles that may be used include particles of oxides such as aluminum oxide (alumina), aluminum oxide hydrate (for example, Boehmite), silicon oxide, magnesium oxide, titanium oxide, $BaTiO_2$, ZrO, and alumina-silica composite oxide; particles of nitrides such as aluminum nitride and boron nitride; particles of covalent crystals such as silicon and diamond; particles of sparingly soluble ionic crystals such as barium sulfate, calcium fluoride, and barium fluoride; and fine particles of clays such as talc and montmorillonite.

Of these inorganic particles, aluminum oxide, barium sulfate, and Boehmite are more preferable from a viewpoint of improving electrical characteristics of a functional layer-containing non-aqueous secondary battery. Moreover, of oxides of aluminum, α-alumina is preferable from a viewpoint of stability and ease of acquisition. One of the types of inorganic particles described above may be used individually, or two or more of the types of inorganic particles described above may be used in combination.

The volume-average particle diameter (D50) of the inorganic particles is preferably 0.2 μm or more, and more preferably 0.3 μm or more, and is preferably 3.5 μm or less, and more preferably 2.5 μm or less. When the volume-average particle diameter of the inorganic particles is at least any of the lower limits set forth above, an increase in the Gurley value of a functional layer (i.e., a decrease in ion conductivity) can be suppressed, and secondary battery output characteristics can be further improved. On the other hand, when the volume-average particle diameter of the inorganic particles is not more than any of the upper limits set forth above, the density of a functional layer can be increased, and electrode short-circuiting caused by lithium dendrites in a lithium ion secondary battery including the functional layer can be inhibited.

The "volume-average particle diameter of the inorganic particles" referred to in the present disclosure can be measured in the same way as the volume-average particle diameter of the organic particles.

The content of the inorganic particles in the composition for a functional layer per 100 parts by mass, in total, of the organic particles and the binder is preferably 100 parts by mass or more, and is preferably 1,000 parts by mass or less, and more preferably 600 parts by mass or less. When the content of the inorganic particles is within any of the ranges set forth above, electrical characteristics of a functional layer-containing non-aqueous secondary battery can be further improved.

<Other Components>

The composition for a non-aqueous secondary battery functional layer may further contain other optional components. No specific limitations are placed on these optional components so long as they do not have an excessively negative influence on battery reactions in a functional layer-containing secondary battery. Furthermore, one of such optional components may be used, or two or more of such optional components may be used.

Examples of optional components that may be used include dispersants, wetting agents, leveling agents, electrolyte solution decomposition inhibitors, and water-soluble polymers. When a polymer is referred to as "water-soluble" in the present disclosure, this means that when 0.5 g of the substance is dissolved in 100 g of water, insoluble content is less than 1.0 mass %. Also note that in the case of a substance for which the solubility thereof varies depending on the pH of water, the polymer is considered to be "water-soluble" so long as there is at least one pH at which the substance satisfies the definition of "water-soluble" set forth above. Examples of water-soluble polymers that may be used include natural polymers, semi-synthetic polymers, and synthetic polymers.

[Dispersant]

Examples of dispersants that may be used include, but are not specifically limited to, sodium polycarboxylates and ammonium polycarboxylates.

The content of a dispersant in the composition for a functional layer per 100 parts by mass of the inorganic particles is preferably at least 0.05 parts by mass and not more than 5 parts by mass. Dispersibility of the composition for a functional layer can be sufficiently improved when the content of the dispersant is at least the lower limit set forth above. Moreover, residual water content in a functional layer formed using the composition for a functional layer can be reduced when the amount of the dispersant is not more than the upper limit set forth above.

[Wetting Agent]

Examples of wetting agents that may be used include, but are not specifically limited to, non-ionic surfactants and anionic surfactants. Of these wetting agents, non-ionic surfactants such as aliphatic polyether-type non-ionic surfactants are preferable.

The content of a wetting agent in the composition for a functional layer per 100 parts by mass of the organic particles is preferably at least 0.05 parts by mass and not more than 2 parts by mass. Coatability of the composition for a functional layer can be sufficiently improved and secondary battery output characteristics can be sufficiently improved when the content of the wetting agent is within the range set forth above.

<Dispersion Medium>

Water is normally used as a dispersion medium in the presently disclosed composition for a functional layer. However, a mixture of water and another solvent may alternatively be used as the dispersion medium. Examples of the other solvent include, but are not specifically limited to, alicyclic hydrocarbon compounds such as cyclopentane and cyclohexane; aromatic hydrocarbon compounds such as toluene and xylene; ketone compounds such as ethyl methyl ketone and cyclohexanone; ester compounds such as ethyl acetate, butyl acetate, γ-butyrolactone, and ε-caprolactone; nitrile compounds such as acetonitrile and propionitrile; ether compounds such as tetrahydrofuran and ethylene glycol diethyl ether; alcohol compounds such as methanol, ethanol, isopropanol, ethylene glycol, and ethylene glycol monomethyl ether; and amide compounds such as N-methylpyrrolidone (NMP) and N,N-dimethylformamide. One of these other solvents may be used individually, or two or more of these other solvents may be used in combination in a freely selected ratio.

<Production of Composition for Non-Aqueous Secondary Battery Functional Layer>

Although no specific limitations are placed on the method by which the composition for a functional layer is produced, the composition for a functional layer is normally obtained through mixing of the organic particles, the binder, the dispersion medium, the inorganic particles used as necessary, and the optional components described above. Although no specific limitations are placed on the mixing method, the mixing is performed using a disperser as a mixing apparatus in order to efficiently disperse the components.

The disperser is preferably a device that enables homogeneous dispersion and mixing of the components. Examples of such devices include a ball mill, a sand mill, a pigment disperser, a grinding machine, an ultrasonic disperser, a homogenizer, and a planetary mixer. Of these examples, a high-level dispersing device such as a bead mill, a roll mill, or a FILMIX is particularly preferable since these devices can impart high dispersing shear.

The solid content concentration of the composition for a functional layer can normally be freely set within a range such that the viscosity of the slurry composition is within a range that does not cause loss of workability in production of a functional layer. Specifically, the solid content concentration of the composition for a functional layer may normally be 10 mass % to 50 mass %.

(Functional Layer for Non-Aqueous Secondary Battery)

The presently disclosed functional layer for a non-aqueous secondary battery is a layer that is formed from the composition for a non-aqueous secondary battery functional layer set forth above. The presently disclosed functional layer for a non-aqueous secondary battery can be formed, for example, by applying the above-described composition for a functional layer onto the surface of a suitable substrate to form an applied film, and then drying the applied film that is formed. In other words, the presently disclosed functional layer for a non-aqueous secondary battery is composed of a dried product of the composition for a non-aqueous secondary battery functional layer set forth above and normally contains: organic particles that include an aromatic monovinyl monomer unit in a proportion of at least 20 mass % and not more than 70 mass % and a (meth)acrylic acid alkyl ester monomer unit in a proportion of at least 30 mass % and not more than 70 mass %, and have a degree of swelling in electrolyte solution of more than a factor of 1.0 and not more than a factor of 4.0, a volume-average particle diameter of at least 0.4 μm and not more than 1.0 μm, and a tetrahydrofuran-insoluble content of at least 20 mass % and not more than 70 mass %; a binder; and optional inorganic particles and other components. In a case in which the organic particles and/or binder set forth above includes a crosslinkable monomer unit, the polymer including the crosslinkable monomer unit may be crosslinked in drying of the composition for a non-aqueous secondary battery functional layer or in heat treatment that is optionally performed after the drying (i.e., the functional layer for a non-aqueous secondary battery may contain a crosslinked product of the organic particles and/or binder set forth above).

The presently disclosed functional layer for a non-aqueous secondary battery has excellent process adhesiveness and can improve electrical characteristics of a non-aqueous secondary battery including the functional layer as a result of being formed using the composition for a non-aqueous secondary battery functional layer set forth above.

[Substrate]

No limitations are placed on the substrate on which the composition for a functional layer is applied. For example, an applied film of the composition for a functional layer may be formed on the surface of a detachable substrate, the applied film may be dried to form a functional layer, and then the detachable substrate may be peeled from the functional layer. The functional layer that is peeled from the detachable substrate in this manner can be used as a free-standing film in formation of a battery member of a secondary battery. Specifically, the functional layer that is peeled from the detachable substrate may be stacked on a separator substrate to form a separator including the functional layer or may be stacked on an electrode substrate to form an electrode including the functional layer.

However, it is preferable that a separator substrate or an electrode substrate is used as the substrate from a viewpoint of raising battery member production efficiency since a step of peeling the functional layer can be omitted. The functional layer provided on the separator substrate or electrode substrate can suitably be used as a protective layer that improves heat resistance, strength, and so forth of the separator or electrode, or as an adhesive layer that adheres battery members to one another.

[Separator Substrate]

The separator substrate is not specifically limited and may be a known separator substrate such as an organic separator substrate. The organic separator substrate is a porous member that is made from an organic material. The organic separator substrate may, for example, be a microporous membrane or non-woven fabric containing a polyolefin resin such as polyethylene or polypropylene, or an aromatic polyamide resin, and is preferably a microporous membrane or non-woven fabric made from polyethylene due to the excellent strength thereof. Although the separator substrate may be of any thickness, the thickness thereof is preferably at least 5 μm and not more than 30 μm, more preferably at least 5 μm and not more than 20 μm, and even more preferably at least 5 μm and not more than 18 μm. A separator substrate thickness of 5 μm or more can ensure sufficient safety. Moreover, a separator substrate thickness of 30 μm or less can inhibit reduction of ion conductivity, inhibit reduction of secondary battery low-temperature output characteristics, inhibit increase of heat contraction force of the separator substrate, and increase heat resistance.

[Electrode Substrate]

The electrode substrate (positive/negative electrode substrate) is not specifically limited and may, for example, be an electrode substrate obtained by forming an electrode mixed material layer on a current collector.

The current collector, an electrode active material (positive/negative electrode active material) and a binder for an electrode mixed material layer (binder for positive/negative electrode mixed material layer) in the electrode mixed material layer, and the method by which the electrode mixed material layer is formed on the current collector may be known examples thereof such as any of those described in JP 2013-145763 A.

<Formation Method of Functional Layer for Non-Aqueous Secondary Battery>

Examples of methods by which the functional layer may be formed on a substrate such as the separator substrate or the electrode substrate set forth above include:

(1) a method in which the presently disclosed composition for a non-aqueous secondary battery functional layer is applied onto the surface of a separator substrate or electrode substrate (surface at the electrode mixed material layer-side in the case of the electrode substrate; same applies below) and is then dried;

(2) a method in which a separator substrate or electrode substrate is immersed in the presently disclosed composition for a non-aqueous secondary battery functional layer and is then dried; and (3) a method in which the presently disclosed composition for a non-aqueous secondary battery functional layer is applied onto a detachable substrate and is dried to produce a functional layer that is then transferred onto the surface of a separator substrate or electrode substrate.

Of these methods, method (1) is particularly preferable since it allows simple control of layer thickness of the functional layer. More specifically, method (1) includes a step of applying the composition for a functional layer onto a substrate (application step) and a step of drying the composition for a functional layer that has been applied onto the substrate to form a functional layer (functional layer formation step).

[Application Step]

Examples of methods by which the composition for a functional layer can be applied onto the substrate in the application step include, but are not specifically limited to, doctor blading, reverse roll coating, direct roll coating, gravure coating, extrusion coating, and brush coating.

[Functional Layer Formation Step]

The method by which the composition for a functional layer on the substrate is dried in the functional layer formation step is not specifically limited and may be a commonly known method. Examples of drying methods that may be used include drying by warm, hot, or low-humidity air; drying in a vacuum; and drying by irradiation with infrared light, an electron beam, or the like. Although no specific limitations are placed on the drying conditions, the drying temperature is preferably 50° C. to 150° C., and the drying time is preferably 5 minutes to 30 minutes.

<Functional Layer Thickness>

The thickness of the functional layer formed using the presently disclosed composition for a non-aqueous secondary battery functional layer is preferably 0.5 μm or more, and more preferably 1.0 μm or more, and is preferably 5 μm or less, more preferably 4.0 μm or less, and even more preferably 2.0 μm or less. A functional layer thickness of 0.5 μm or more can further improve heat resistance and strength of a battery member provided with the functional layer through enhancement of the protective function of the functional layer. Moreover, a functional layer thickness of 5 μm or less can cause a secondary battery to display excellent low-temperature output characteristics.

(Battery Member Including Functional Layer)

A battery member (separator or electrode) including the presently disclosed functional layer may include elements other than the presently disclosed functional layer set forth above in addition to the separator substrate or electrode substrate and the presently disclosed functional layer so long as the effects disclosed herein are not significantly lost.

These elements other than the presently disclosed functional layer may be any elements that do not correspond to the presently disclosed functional layer, and one example thereof is an adhesive layer for adhering battery members to one another that may be provided on the presently disclosed functional layer.

(Non-Aqueous Secondary Battery)

The presently disclosed non-aqueous secondary battery includes the presently disclosed functional layer for a non-aqueous secondary battery set forth above. More specifically, the presently disclosed non-aqueous secondary battery includes a positive electrode, a negative electrode, a separator, and an electrolyte solution, and at least one battery member among the positive electrode, the negative electrode, and the separator includes the functional layer for a non-aqueous secondary battery set forth above. The presently disclosed non-aqueous secondary battery can display excellent electrical characteristics (for example, cycle characteristics and low-temperature output characteristics).

<Positive Electrode, Negative Electrode, and Separator>

At least one of the positive electrode, the negative electrode, and the separator used in the presently disclosed secondary battery includes the presently disclosed functional layer. Specifically, an electrode produced by forming an electrode mixed material layer on a current collector to form an electrode substrate and then providing the presently disclosed functional layer on the electrode substrate may be used as a positive electrode that includes a functional layer or a negative electrode that includes a functional layer. Moreover, a separator produced by providing the presently disclosed functional layer on a separator substrate may be used as a separator that includes a functional layer. Examples of electrode substrates and separator substrates that can be used include the same examples as in the "Functional layer for non-aqueous secondary battery" section.

Moreover, an electrode composed of an electrode substrate such as previously described or a separator composed of a separator substrate such as previously described may be used, without any specific limitations, as a positive electrode, negative electrode, or separator that does not include a functional layer.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution so long as the supporting electrolyte can dissolve therein. Suitable examples of organic solvents that may be used in a lithium ion secondary battery include carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution can be adjusted as appropriate. Furthermore, known additives may be added to the electrolyte solution.

(Production Method of Non-Aqueous Secondary Battery)

The presently disclosed non-aqueous secondary battery set forth above can be produced by, for example, stacking the positive electrode and the negative electrode with the separator in-between, performing rolling, folding, or the like of the resultant laminate as necessary to place the laminate in a battery container, injecting the electrolyte solution into the battery container, and sealing the battery container. At least one of the positive electrode, the negative electrode, and the separator is a functional layer-equipped member. An expanded metal, an overcurrent prevention element such as a fuse or a PTC element, a lead plate, or the like may be placed in the battery container as required in order to prevent pressure from increasing inside the battery container and prevent overcharging or overdischarging from occurring. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%", "ppm", and "parts" used to express quantities are by mass, unless otherwise specified.

Moreover, in the case of a polymer that is produced through copolymerization of a plurality of types of monomers, the proportion constituted by a monomer unit in the polymer that is formed through polymerization of a given monomer is normally, unless otherwise specified, the same as the ratio (charging ratio) of the given monomer among all monomers used in polymerization of the polymer.

In the examples and comparative examples, the following methods were used to measure the degree of swelling in electrolyte solution, THF-insoluble content, and glass-transition temperature of organic particles, and the volume-average particle diameter of organic particles and a binder. Moreover, the following methods were used to evaluate the process adhesiveness of a functional layer and the lithium deposition resistance, cycle characteristics, and low-temperature output characteristics of a secondary battery.

<Degree of Swelling in Electrolyte Solution of Organic Particles>

A water dispersion containing organic particles was produced in each example or comparative example, and this water dispersion was loaded into a petri dish made of polytetrafluoroethylene and was dried for 48 hours at 25° C. to prepare a powder. A film of 2.0 mm in thickness was produced by shaping approximately 0.2 g of the powder into the form of a film through 2 minutes of pressing at 200° C. and 5 MPa. The produced film was cut to a rectangular shape of 20 mm in length and 20 mm in width to produce a specimen. The weight of the specimen was measured and was taken to be $W^S_0$.

The specimen was immersed in an electrolyte solution (solvent:ethylene carbonate/diethyl carbonate/vinylene carbonate (volume mixing ratio)=68.5/30/1.5; electrolyte: $LiPF_6$ of 1 M in concentration) for 72 hours at 60° C. The specimen was then taken out from the electrolyte solution, electrolyte solution on the surface of the specimen was wiped off, and the weight $W^S_1$ of the specimen after the immersion test was measured.

The weights $W^S_0$ and $W^S_1$ were used to calculate the degree of swelling S (factor) by $S=W^S_1/W^S_0$.

<THF-Insoluble Content of Organic Particles>

A dispersion liquid containing water and organic particles produced in each example or comparative example was prepared, and this dispersion liquid was dried in an environment having a humidity of 50% and a temperature of 23° C. to 25° C. to produce a film of 3±0.3 mm in thickness. The produced film was cut into 5 mm squares to prepare film pieces. Approximately 1 g of these film pieces was precisely weighed out. The weight of the obtained film pieces was taken to be $W^{THF}_0$. These film pieces were immersed in 100 g of tetrahydrofuran (THF) for 24 hours. Thereafter, these film pieces were pulled out of the THF. The film pieces that had been pulled out were vacuum dried for 3 hours at 105° C., and then the total weight thereof (weight of insoluble content) $W^{THF}_1$ was measured. The THF-insoluble content Ins (%) was calculated by the following formula.

$$Ins(\%)=W^{THF}_1/W^{THF}_0 \times 100$$

<Glass-Transition Temperature of Organic Particles>

A water dispersion containing organic particles produced in each example or comparative example was dried for 3 days in an environment having a humidity of 50% and a temperature of 23° C. to 25° C. to obtain a film of 1±0.3 mm in thickness. This film was dried for 1 hour in a hot air oven at 120° C. The dried film was then used as a sample to measure the glass-transition temperature (° C.) in accordance with JIS K7121 using a differential scanning calorimeter (DSC6220 produced by SII Nanotechnology) with a measurement temperature of from −100° C. to 180° C. and a heating rate of 5° C./min.

<Volume-Average Particle Diameter of Organic Particles and Binder>

A water dispersion having a solid content concentration of 0.1 mass % was prepared for organic particles and for a binder for a functional layer produced in each example or comparative example. The water dispersion was measured using a laser diffraction particle diameter distribution analyzer (produced by Beckman Coulter, Inc.; product name: LS-230) to obtain a particle size distribution (volume basis). The particle diameter (μm) at which cumulative volume calculated from the small diameter end of the distribution reached 50% was determined as the volume-average particle diameter of the organic particles or binder for a functional layer.

<Process Adhesiveness of Functional Layer>

A positive electrode, a negative electrode, and a separator produced in each example or comparative example were each cut out to 10 mm in width and 50 mm in length. The positive/negative electrode and the separator were stacked and the resultant laminate was pressed by roll pressing at a temperature of 80° C., a load of 10 kN/m, and a conveyance speed of 5 m/min to obtain a specimen.

The specimen was placed with the surface at the current collector-side of the positive/negative electrode facing downward, and cellophane tape was attached to the surface of the electrode. Tape prescribed by JIS Z1522 was used as the cellophane tape. The cellophane tape was fixed to a horizontal test stage. One end of the separator substrate was pulled vertically upward at a pulling speed of 50 mm/min to peel off the separator substrate and the stress during this peeling was measured. This measurement was performed three times for laminates that each included a positive electrode and a separator and three times for laminates that each included a negative electrode and a separator (i.e., six times in total). The average value of the stress was determined as the peel strength, and then adhesiveness between an electrode substrate and a separator substrate was evaluated by the following standard. A larger peel strength indicates that a functional layer has higher process adhesiveness.

A: Peel strength of 10 N/m or more
B: Peel strength of at least 5 N/m and less than 10 N/m
C: Peel strength of at least 1 N/m and less than 5 N/m
D: Peel strength of less than 1 N/m <Lithium Deposition Resistance of Secondary Battery>

A lithium ion secondary battery produced in each example or comparative example was left for 5 hours at a temperature of 25° C. after electrolyte solution had been injected. Next, the lithium ion secondary battery was charged to a cell voltage of 3.65 V by a 0.2 C constant-current method at a temperature of 25° C., and was then subjected to aging treatment for 12 hours at a temperature of 60° C. The lithium ion secondary battery was subsequently discharged to a cell voltage of 3.00 V by a 0.2 C constant-current method at a temperature of 25° C. Thereafter, CC-CV charging of the lithium ion secondary battery was performed by a 0.2 C constant-current method (upper limit cell voltage 4.30 V) and CC discharging of the lithium ion secondary battery was performed to 3.00 V by a 0.2 C constant-current method.

Next, 10 cycles were carried out of an operation in which the lithium ion secondary battery was charged and discharged between a cell voltage of 4.30 V and a cell voltage of 3.00 V with a charge/discharge rate of 1.0 C at an ambient temperature of 25° C. Thereafter, the lithium ion secondary battery was charged at 1.0 C and then the cell was disassembled. The state of lithium deposition on the surface of the negative electrode was visually inspected and was evaluated in accordance with the following standard.

A: Lithium deposition observed over less than 5% of negative electrode surface
B: Lithium deposition observed over at least 5% and less than 20% of negative electrode surface
C: Lithium deposition observed over 20% or more of negative electrode surface <Cycle Characteristics of Secondary Battery>

A wound lithium ion secondary battery having a discharge capacity of 800 mAh produced in each example or comparative example was left for 24 hours at an ambient temperature of 25° C. Next, the lithium ion secondary battery was subjected to an operation of charging to 4.4 V at 0.1 C and discharging to 2.75 V at 0.1 C, and the initial capacity $C_0$ of the lithium ion secondary battery was measured. The lithium ion secondary battery was then repeatedly subjected to the same charge/discharge operation at an ambient temperature of 25° C., and the capacity $C_1$ of the lithium ion secondary battery after 1,000 cycles was measured. The capacity maintenance rate $\Delta C$ (%) through this cycling ($\Delta C$ (%)=$C_1/C_0 \times 100$) was calculated and was evaluated by the following standard. A larger value for the capacity maintenance rate $\Delta C$ indicates better cycle characteristics.

A: Capacity maintenance rate $\Delta C$ of 85% or more
B: Capacity maintenance rate $\Delta C$ of at least 75% and less than 85%
C: Capacity maintenance rate $\Delta C$ of at least 70% and less than 75%
D: Capacity maintenance rate $\Delta C$ of less than 70%

<Low-Temperature Output Characteristics of Secondary Battery>

An 800 mAh wound lithium ion secondary battery produced in each example or comparative example was left for 24 hours at an ambient temperature of 25° C. A charging operation was then performed for 5 hours at a charging rate of 0.1 C and an ambient temperature of 25° C., and the voltage $V_0$ at this time was measured. Thereafter, the lithium ion secondary battery was discharged at a discharge rate of 1 C and an ambient temperature of −10° C., and the voltage $V_1$ at 15 s after the start of discharge was measured.

The voltage change $\Delta V$ was calculated by $\Delta V = V_0 - V_1$. A smaller value for the voltage change $\Delta V$ indicates better low temperature output characteristics.

A: Voltage change $\Delta V$ of less than 350 mV
B: Voltage change $\Delta V$ of at least 350 mV and less than 450 mV
C: Voltage change $\Delta V$ of at least 450 mV and less than 600 mV
D: Voltage change $\Delta V$ of 600 mV or more Example 1

<Production of Organic Particles>

A vessel equipped with a stirrer was charged with 56.5 parts of styrene (ST) as an aromatic monovinyl monomer, 40.0 parts of n-butyl acrylate (BA) as a (meth)acrylic acid alkyl ester monomer, 3.0 parts of acrylic acid (AA) as an acidic group-containing monomer, 0.5 parts of ethylene glycol dimethacrylate (EDMA) as a crosslinkable monomer, 0.5 parts of sodium dodecylbenzenesulfonate as an emulsifier, 150 parts of deionized water, and 0.5 parts of potassium persulfate as a polymerization initiator. These materials were sufficiently stirred and were then heated to 60° C. to initiate polymerization. The reaction was terminated by cooling at the point at which the polymerization conversion rate of all added monomers reached 96% to yield a water dispersion containing organic particles.

The degree of swelling in electrolyte solution, THF-insoluble content, glass-transition temperature, and volume-average particle diameter of the obtained organic particles were measured.

<Production of Binder>

A reactor equipped with a stirrer was charged with 70 parts of deionized water, 0.15 parts of sodium lauryl sulfate (produced by Kao Corporation; product name: EMAL 2F) as an emulsifier, and 0.5 parts of ammonium persulfate as a polymerization initiator. The gas phase of the reactor was purged with nitrogen gas and the contents of the reactor were heated to 60° C.

A monomer mixture was obtained in a separate vessel by mixing 50 parts of deionized water, 0.5 parts of sodium dodecylbenzenesulfonate as a dispersant, 94 parts of butyl acrylate as a (meth)acrylic acid alkyl ester monomer, 2 parts of acrylonitrile, 2 parts of methacrylic acid, 1 part of N-methylolacrylamide, and 1 part of acrylamide. The monomer mixture was continuously added to the reactor over 4 hours to perform polymerization. The reaction was carried out at 60° C. during the addition. After this addition, the contents of the reactor were stirred for a further 3 hours at 70° C. to complete the reaction and yield a water dispersion containing an acrylic polymer (ACL) as a binder.

The volume-average particle diameter of the obtained binder was measured. Note that the THF-insoluble content of the binder as measured in the same way as the THF-insoluble content of the organic particles was 92 mass %.

<Production of Composition for Functional Layer>

A crude dispersion liquid was obtained by adding 2.5 parts of a polycarboxylic acid-type dispersant (SN DISPERSANT 5020 produced by San Nopco Limited) to 100 parts of α-alumina particles (LS-256 produced by Nippon Light Metal Co., Ltd.; primary particle diameter: 0.8 μm; specific surface area: 6.4 m$^2$/g) used as inorganic particles, and then adding water to adjust the solid content concentration to 50%. This crude dispersion liquid was passed once through a media-less disperser (produced by IKA Japan K.K.; product name: Inline mill MKO) to perform dispersion treatment and prepare a water dispersion of α-alumina particles. The dispersion treatment of the crude dispersion liquid using the media-less disperser was carried out under conditions of a rotor-stator gap of 0.1 mm, a circumferential speed of 10 m/s, and a flow rate of 200 L/hr.

Mixing and dispersing was then performed of 100 parts in terms of solid content of the water dispersion of the α-alumina particles used as inorganic particles, 7 parts in terms of solid content of the previously described binder, and deionized water. In addition, 93 parts in terms of solid content of the previously described water dispersion of organic particles and 0.2 parts of a polyethylene glycol-type surfactant (produced by San Nopco Limited; product name: SAN NOPCO® SN WET 366 (SAN NOPCO is a registered trademark in Japan, other countries, or both)) as a wetting agent were mixed, and the solid content concentration was adjusted to 40% to obtain a composition for a functional layer.

<Production of Functional Layer and Functional Layer-Equipped Separator>

An organic separator formed from a porous material made of polyethylene (thickness: 16 μm; Gurley value: 210 s/100 cc) was prepared as a separator substrate. The previously described composition for a functional layer was applied onto both sides of the prepared substrate and was dried for 3 minutes at 50° C. In this manner, a separator including a functional layer of 1 μm in thickness at each side (functional layer-equipped separator) was produced.

<Production of Negative Electrode>

A 5 MPa pressure vessel equipped with a stirrer was charged with 33.5 parts of 1,3-butadiene, 3.5 parts of itaconic acid, 62 parts of styrene, 1 part of 2-hydroxyethyl acrylate, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. The reaction was terminated by cooling at the point at which the polymerization conversion rate of all added monomers reached 96% to yield a mixture containing a particulate binder (styrene-butadiene copolymer: SBR). The mixture containing the particulate binder was adjusted to pH 8 through addition of 5% sodium hydroxide aqueous solution and was then subjected to thermal-vacuum distillation to remove unreacted monomer. Thereafter, the mixture was cooled to 30° C. or lower to obtain a water dispersion containing a desired particulate binder for a negative electrode.

Next, 100 parts of artificial graphite (volume-average particle diameter: 15.6 μm) as a negative electrode active material, 1 part in terms of solid content of a 2% aqueous solution of a sodium salt of carboxymethyl cellulose (produced by Nippon Paper Industries Co., Ltd.; product name: MAC350HC) as a viscosity modifier, and deionized water were mixed. These materials were adjusted to a solid content concentration of 68% and were then mixed for 60 minutes at 25° C. Next, deionized water was used to adjust the solid content concentration to 62% and further mixing was performed for 15 minutes at 25° C. Thereafter, 1.5 parts in terms of solid content of the previously described water dispersion containing the particulate binder for a negative electrode and deionized water were added to the resultant mixture. The mixture was adjusted to a final solid content concentration of 52% and was further mixed for 10 minutes. The resultant mixture was subjected to a defoaming process under reduced pressure to yield a slurry composition for a negative electrode having good fluidity.

The slurry composition for a negative electrode obtained as described above was applied onto copper foil (current collector) of 20 μm in thickness using a comma coater such as to have a thickness of approximately 150 μm after drying. The applied slurry composition was dried by conveying the copper foil inside a 60° C. oven for 2 minutes at a speed of 0.5 m/min. Thereafter, heat treatment was performed for 2 minutes at 120° C. to obtain a pre-pressing negative electrode web. The pre-pressing negative electrode web was rolled by roll pressing to obtain a post-pressing negative electrode including a negative electrode mixed material layer of 80 μm in thickness.

<Production of Positive Electrode>

A mixture of 100 parts of LiCoO$_2$ (volume-average particle diameter: 12 μm) as a positive electrode active material, 2 parts of acetylene black (produced by Denki Kagaku Kogyo Kabushiki Kaisha; product name: HS-100) as a conductive material, 2 parts in terms of solid content of polyvinylidene fluoride (produced by Kureha Corporation; product name: #7208) as a binder, and N-methylpyrrolidone was prepared and was adjusted to a total solid content concentration of 70%. These materials were mixed using a planetary mixer to produce a slurry composition for a positive electrode.

The slurry composition for a positive electrode obtained as described above was applied onto aluminum foil (current collector) of 20 μm in thickness using a comma coater such as to have a thickness of approximately 150 μm after drying. The applied slurry composition was dried by conveying the aluminum foil inside a 60° C. oven for 2 minutes at a speed of 0.5 m/min. Thereafter, heat treatment was performed for 2 minutes at 120° C. to obtain a positive electrode web. The pre-pressing positive electrode web was rolled by roll pressing to obtain a post-pressing positive electrode including a positive electrode mixed material layer of 80 μm in thickness.

<Production of Lithium Ion Secondary Battery>

The post-pressing positive electrode obtained as described above was cut out to 49 cm×5 cm and was placed with the surface at the positive electrode mixed material layer-side thereof facing upward. A separator that had been cut out to 120 cm×5.5 cm and included a functional layer at both sides thereof was placed on the positive electrode such that the positive electrode was positioned at the longitudinal direction left-hand side of the separator. The post-pressing negative electrode obtained as described above was cut out to 50 cm×5.2 cm and was placed on the separator such that the surface at the negative electrode mixed material layer-side of the negative electrode faced the separator and such that the negative electrode was positioned at the longitudinal direction right-hand side of the separator. A winding machine was used to wind the resultant product with the longitudinal direction center of the separator at the center to obtain a roll. The roll was pressed at 60° C. and 0.5 MPa to obtain a flattened roll that was then enclosed in an aluminum packing case serving as a battery case. An electrolyte solution (solvent: ethylene carbonate/diethyl carbonate/vinylene carbonate (volume mixing ratio)=68.5/30/1.5; electrolyte:LiPF$_6$ of 1 M in concentration) was injected into the aluminum packing case such that air did not remain and then the aluminum packing case was closed by heat sealing at 150° C. to seal an opening of the aluminum packing case and thereby produce a wound lithium ion secondary battery having a discharge capacity of 800 mAh as a non-aqueous secondary battery.

The lithium deposition resistance, cycle characteristics, and low-temperature output characteristics of the obtained lithium ion secondary battery were evaluated in accordance with the previously described methods.

Examples 2 to 6, 11, and 12

A composition for a functional layer, a functional layer-equipped separator, a negative electrode, a positive electrode, and a secondary battery were produced in the same way as in Example 1 with the exception that the types and charging ratios of monomers used in production of the organic particles were changed such that the chemical composition, degree of swelling in electrolyte solution, THF-insoluble content, and glass-transition temperature of the organic particles were changed as shown in Table 1. Each of the measurements and evaluations was carried out in the same way as in Example 1. The results are shown in Table 1.

Examples 7 and 8

A composition for a functional layer, a functional layer-equipped separator, a negative electrode, a positive electrode, and a secondary battery were produced in the same way as in Example 1 with the exception that the amount of sodium lauryl sulfate (produced by Kao Corporation; product name: EMAL 2F) added as an emulsifier in production of the organic particles was changed to 1.2 parts (Example 7) or 0.3 parts (Example 8). Each of the measurements and evaluations was carried out in the same way as in Example 1. The results are shown in Table 1.

Examples 9 and 10

A composition for a functional layer, a functional layer-equipped separator, a negative electrode, a positive electrode, and a secondary battery were produced in the same way as in Example 1 with the exception that barium sulfate particles (primary particle diameter: 0.8 μm; specific surface area: 4.2 m$^2$/g) were used in Example 9 and Boehmite particles (primary particle diameter: 0.7 μm; specific surface area: 16 m$^2$/g) were used in Example 10 instead of α-alumina particles as inorganic particles in production of the composition for a functional layer. Each of the measurements and evaluations was carried out in the same way as in Example 1. The results are shown in Table 1.

Comparative Examples 1 to 4

A composition for a functional layer, a functional layer-equipped separator, a negative electrode, a positive electrode, and a secondary battery were produced in the same way as in Example 1 with the exception that the types and charging ratios of monomers used in production of the organic particles were changed such that the chemical composition, degree of swelling in electrolyte solution, THF-insoluble content, and glass-transition temperature of the organic particles were changed as shown in Table 1. Each of the measurements and evaluations was carried out in the same way as in Example 1. In particular, 1,3-butadiene was used instead of a (meth)acrylic acid alkyl ester monomer in Comparative Example 2 so as to obtain a styrene-butadiene copolymer. The results are shown in Table 1.

Comparative Examples 5 and 6

A composition for a functional layer, a functional layer-equipped separator, a negative electrode, a positive electrode, and a secondary battery were produced in the same way as in Example 1 with the exception that the amount of sodium lauryl sulfate (produced by Kao Corporation; product name: EMAL 2F) added as an emulsifier in production of the organic particles was changed to 0.1 parts (Comparative Example 5) or 3.0 parts (Comparative Example 6), and the thickness of the functional layer in production of the functional layer-equipped separator was changed to 1.8 μm in Comparative Example 5. Each of the measurements and evaluations was carried out in the same way as in Example 1. The results are shown in Table 1.

In Table 1:
"THF" indicates tetrahydrofuran;
"ST" indicates styrene;
"BA" indicates butyl acrylate;
"EDMA" indicates ethylene dimethacrylate;
"AA" indicates acrylic acid;
"ACL" indicates acrylic polymer;
"NaSS" indicates sodium styrenesulfonate;
"AMA" indicates allyl methacrylate;
"2-EHA" indicates 2-ethylhexyl acrylate;
"CHXA" indicates cyclohexyl acrylate; and
"BD" indicates 1,3-butadiene.

TABLE 1

| | | | Examples | | | | | | | | | | | | Comparative examples | | | | | |
|---|---|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 1 | 2 | 3 | 4 | 5 | 6 |
| Composition for non-aqueous secondary battery functional layer | Organic particles | Degree of swelling in electrolyte solution [factor] | 2.2 | 3.9 | 3.6 | 2.2 | 2.3 | 2.2 | 2.2 | 2.2 | 2.2 | 2.2 | 1.9 | 3.6 | 4.3 | 1.4 | 2.2 | 4.2 | 2.2 | 2.2 |
| | | THF-insoluble content [mass %] | 46 | 48 | 51 | 23 | 68 | 56 | 46 | 46 | 46 | 46 | 55 | 60 | 41 | 75 | 78 | 68 | 46 | 46 |
| | | Volume-average particle diameter [μm] | 0.6 | 0.6 | 0.6 | 0.6 | 0.6 | 0.6 | 0.45 | 0.85 | 0.6 | 0.6 | 0.6 | 0.6 | 0.6 | 0.6 | 0.6 | 0.6 | 1.5 | 0.2 |
| | | Glass-transition temperature [°C] | 14.8 | −25.1 | 15.6 | 14.9 | 15.2 | 15.1 | 14.8 | 14.8 | 14.8 | 14.8 | −3.5 | 27 | −35 | −2.4 | 14.9 | −31.4 | 14.8 | 14.8 |
| | | Aromatic monovinyl monomer unit — Type | 93 ST | 93 ST | 93 ST/NaSS | 93 ST | 93 ST | 93 ST | 93 ST | 93 ST | 93 ST | 93 ST | 93 ST | 93 ST | 93 ST | 93 ST | 93 ST | 93 ST | 93 ST | 93 ST |
| | | Aromatic monovinyl monomer unit — Percentage content [mass %] | 56.5 | 28.5 | 50/6.5 | 56.75 | 56.2 | 56.5 | 56.5 | 56.5 | 56.5 | 56.5 | 56.5 | 56.5 | 18.8 | 57.0 | 56.0 | 21.0 | 56.5 | 56.5 |
| | | (Meth)acrylic acid alkyl ester monomer unit — Type | BA | BA | BA | BA | BA | BA | BA | BA | BA | BA | 2-EHA | CHXA | BA | — | BA | BA | BA | BA |
| | | (Meth)acrylic acid alkyl ester monomer unit — Carbon number of alkyl group in monomer unit [no.] | 4 | 4 | 4 | 4 | 4 | 4 | 4 | 4 | 4 | 4 | 8 | 6 | 4 | — | 4 | 4 | 4 | 4 |
| | | (Meth)acrylic acid alkyl ester monomer unit — Percentage content [mass %] | 40.0 | 68.0 | 40.0 | 40.0 | 40.0 | 40.0 | 40.0 | 40.0 | 40.0 | 40.0 | 40.0 | 40.0 | 78.0 | — | 40.0 | 75.0 | 40.0 | 40.0 |
| | | Crosslinkable monomer unit — Type | EDMA | EDMA | EDMA | EDMA | EDMA | AMA | EDMA | EDMA | EDMA | EDMA | EDMA | EDMA | EDMA | — | EDMA | EDMA | EDMA | EDMA |
| | | Crosslinkable monomer unit — Percentage content [mass %] | 0.5 | 0.5 | 0.5 | 0.25 | 0.8 | 0.5 | 0.5 | 0.5 | 0.5 | 0.5 | 0.5 | 0.5 | 0.2 | — | 1.0 | 1.0 | 0.5 | 0.5 |
| | | Acidic group-containing monomer unit — Type | AA | AA | AA | AA | AA | AA | AA | AA | AA | AA | AA | AA | AA | AA | AA | AA | AA | AA |
| | | Acidic group-containing monomer unit — Percentage content [mass %] | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| | | Other monomer units — Type | — | — | — | — | — | — | — | — | — | — | — | — | — | BD | — | — | — | — |
| | | Other monomer units — Percentage content [mass %] | — | — | — | — | — | — | — | — | — | — | — | — | — | 40.0 | — | — | — | — |
| | Binder | Type | ACL | ACL | ACL | ACL | ACL | ACL | ACL | ACL | ACL | ACL | ACL | ACL | ACL | ACL | ACL | ACL | ACL | ACL |
| | | Volume-average particle diameter [μm] | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| | Content mass ratio of organic particles and binder [organic particles:binder] | | 93:7 | 93:7 | 93:7 | 93:7 | 93:7 | 93:7 | 93:7 | 93:7 | 93:7 | 93:7 | 93:7 | 93:7 | 93:7 | 93:7 | 93:7 | 93:7 | 93:7 | 93:7 |
| | Inorganic particles | Type | α-Alumina | α-Alumina | α-Alumina | α-Alumina | α-Alumina | α-Alumina | α-Alumina | α-Alumina | Barium sulfate | Boehmite | α-Alumina | α-Alumina | α-Alumina | α-Alumina | α-Alumina | α-Alumina | α-Alumina | α-Alumina |

TABLE 1-continued

|  |  | Examples | | | | | | | | | | | | Comparative examples | | | | | |
| --- | --- | --- | --- | --- | --- | --- | --- | --- | --- | --- | --- | --- | --- | --- | --- | --- | --- | --- | --- |
|  |  | 1 | 2 | 3 | 4 | 5 | 6 | 7 | 8 | 9 | 10 | 11 | 12 | 1 | 2 | 3 | 4 | 5 | 6 |
| Functional layer | cles Content [parts by mass] | 100 | 100 | 100 | 100 | 100 | 100 | 100 | 100 | 100 | 100 | 100 | 100 | 100 | 100 | 100 | 100 | 100 | 100 |
|  | Thickness [µm] | 1 | 1 | 1 | 1 | 1 | 1 | 1 | 1 | 1 | 1 | 1 | 1 | 1 | 1 | 1 | 1 | 1 | 1 |
| Evaluation | Process adhesiveness of functional layer | A | A | A | A | B | A | A | A | A | A | B | B | A | C | D | D | B | B |
|  | Lithium deposition resistance of secondary battery | A | A | A | A | A | A | B | A | A | A | A | B | A | A | A | A | A | C |
|  | Cycle characteristics of secondary battery | A | B | B | B | A | A | B | B | A | A | B | B | D | C | A | D | A | A |
|  | Low-temperature output characteristics of secondary battery | A | B | A | A | A | A | A | B | A | A | B | B | C | B | A | C | D | A |

It can be seen from Table 1 that in Examples 1 to 12 in which a composition for a functional layer was used that contained a binder and organic particles including a (meth) acrylic acid alkyl ester monomer unit and an aromatic monovinyl monomer unit in specific proportions and having a degree of swelling in electrolyte solution, a volume-average particle diameter, and a THF-insoluble content controlled to within specific ranges, process adhesiveness of a functional layer was excellent, and a secondary battery including the functional layer had excellent cycle characteristics and low-temperature output characteristics. In contrast, it can be seen that functional layer process adhesiveness was poor and secondary battery cycle characteristics and low-temperature output characteristics were poor in Comparative Examples 1 to 6 in which the degree of swelling in electrolyte solution, volume-average particle diameter, and/or THF-insoluble content were not controlled to within specific ranges.

INDUSTRIAL APPLICABILITY

According to the present disclosure, it is possible to provide a composition for a non-aqueous secondary battery functional layer that can form a functional layer having excellent process adhesiveness and can improve electrical characteristics of a non-aqueous secondary battery.

Moreover, according to the present disclosure, it is possible to provide a functional layer for a non-aqueous secondary battery that has excellent process adhesiveness and can improve electrical characteristics of a non-aqueous secondary battery, and a non-aqueous secondary battery that includes this functional layer for a non-aqueous secondary battery and has good electrical characteristics.

The invention claimed is:

1. A composition for a non-aqueous secondary battery functional layer comprising organic particles and a binder, wherein
    the organic particles include an aromatic monovinyl monomer unit in a proportion of at least 20 mass % and not more than 70 mass %, a (meth)acrylic acid alkyl ester monomer unit in a proportion of at least 30 mass % and not more than 70 mass %, and a crosslinkable monomer unit in a proportion of at least 0.2 mass % and not more than 0.8 mass %,
    the organic particles have a degree of swelling in electrolyte solution of more than a factor of 1.0 and not more than a factor of 4.0,
    the organic particles have a volume average particle diameter of at least 0.4 µm and not more than 1.0 µm,
    the organic particles have a tetrahydrofuran-insoluble content of at least 20 mass % and not more than 70 mass %, and
    the binder is an acrylic polymer having a volume average particle diameter of at least 0.1 µm and not more than 0.35 µm.

2. The composition for a non-aqueous secondary battery functional layer according to claim 1, wherein the organic particles are a random copolymer.

3. The composition for a non-aqueous secondary battery functional layer according to claim 1, further comprising inorganic particles.

4. A functional layer for a non-aqueous secondary battery formed using the composition for a non-aqueous secondary battery functional layer according to claim 1.

5. A non-aqueous secondary battery comprising the functional layer for a non-aqueous secondary battery according to claim 4.

* * * * *